United States Patent [19]

Ershig

[11] Patent Number: 4,660,864
[45] Date of Patent: Apr. 28, 1987

[54] SEALING ADAPTER FOR PIPE FOR DIFFERING MATERIAL

[75] Inventor: A. Herbert Ershig, Bellingham, Wash.

[73] Assignee: Ershigs, Inc., Bellingham, Wash.

[21] Appl. No.: 815,354

[22] Filed: Dec. 30, 1985

[51] Int. Cl.4 ............................................. F16L 55/00
[52] U.S. Cl. .................................... 285/173; 285/345; 285/369; 285/423; 285/111; 285/379
[58] Field of Search ............... 285/173, 175, 345, 369, 285/383, 233, 423, 111, 379

[56] References Cited

U.S. PATENT DOCUMENTS

| | | | |
|---|---|---|---|
| 1,924,020 | 8/1933 | Bihet | 285/345 X |
| 2,264,480 | 12/1941 | Owen | 285/345 X |
| 2,294,142 | 8/1942 | Turner | 285/383 X |
| 2,871,031 | 1/1959 | Altemus et al. | 285/345 X |
| 3,598,430 | 8/1971 | Maher et al. | 285/423 X |
| 4,281,856 | 8/1983 | Litman et al. | 285/423 X |
| 4,466,640 | 8/1984 | Houtte | 285/369 X |

Primary Examiner—Dave W. Arola
Attorney, Agent, or Firm—Graybeal, Jensen & Puntigam

[57] ABSTRACT

A sealing adapter hoop (6) designed to be sealingly slip fitted over conduits of differing structure (2,4) including chamferred ends (14,22), a smooth surface (20) to interact with a captured O-ring (30) and a groove (16) to accept a second O-ring (18).

1 Claim, 3 Drawing Figures

SEALING ADAPTER FOR PIPE FOR DIFFERING MATERIAL

DESCRIPTION

1. Technical Field

This invention relates to a seal enabling the conjunctive use of pipes of different structure and therefore different responses under stress and, more particularly, to a sealing coupler which allows the adaptation of an existing asbestos cement pipe to a fibrous reinforced plastic system.

2. Background Art

Asbestos cement pipe because of its resistance to corrosion and minimal cost of manufacture, had become a standard in many industrial uses. The discovery of the risk of increased susceptibility to cancer by those necessarily in close contact with asbestos and/or who use or are exposed to products which have been in close contact with asbestos has severly curtailed the use of asbestos in any form and particularly when use involves exposure of humans.

There are many situations and environments, however, where asbestos cement pipe has already been installed and it would be prohibitively expensive to replace these installations. In those situations where the risk to humans is minimum, a business decision is often made to retain portions of the asbestos cement pipe. There is, however, a need for the ability to adapt these installations to interface with acceptable conduit material such as fiberglass reinforced plastic where there will be increased human contact and the replacement and/or extension is not prohibitively expensive.

Because of the nature of cement asbestos conduits, the usual mechanical or adhesive interconnection is not possible and therefore a secure, fluid tight coupling utilizing a slip fit is necessary.

DISCLOSURE OF THE INVENTION

The present invention contemplates a ring-type adapter which sealingly interconnects a large asbestos-cement conduit to a similar interior diameter fiberglass reinforced plastic conduit without requiring extensive work on the asbestos cement element.

An object of the present invention is to provide an adapter ring which sealingly allows the butt joinder of an asbestos cement conduit with a fiberglass reinforced conduit wherein said adapter ring is of sufficient strength to sealingly make the interconnection and further capable of adjustment enabling it to absorb the different expansions caused by the pressure and/or temperature within the conduits.

Another object of the present invention is to provide an adapter ring which allows an inexpensive butt-type joinder between an asbestos-cement conduit, not capable of machining, with a fiberglass reinforced plastic conduit, said adapter is capable of being slip fit over the butt end of each of the conduits and requires no additional securement.

BEST MODE FOR CARRYING OUT THE INVENTION

Figure 1:
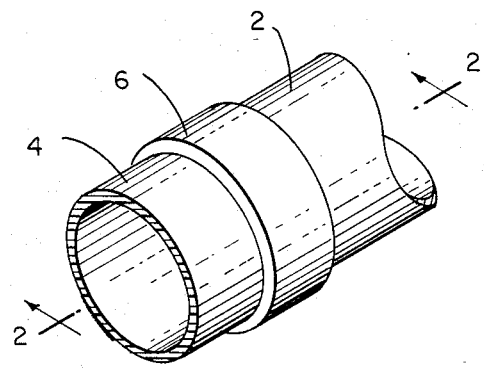
FIG. 1 is an environmental view disclosing the inventive adapter ring in position.

As seen in FIG. 1, an asbestos-cement conduit 2 is butt joined with a fiberglass reinforced plastic conduit 4 and a sealing interconnection is provided by adapter ring 6.

Figure 2:
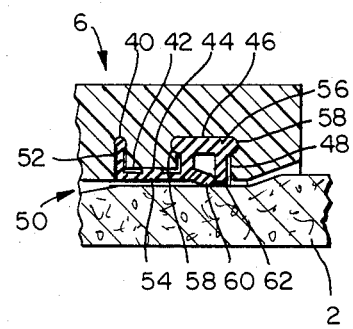
FIG. 2 is a sectional view along lines 2—2 of FIG. 1 further disclosing the interconnection of the two conduits and the adapter ring.

Referring now to FIG. 2, it can be seen that the two conduits have identical interior diameter but dissimilar exterior diameters and dissimilar butt end configurations. The asbestos cement conduit 2 has a reduced exterior diameter, such that it is less than 22.46" in diameter, as at 8 and has a chamferred end portion 10.

The adpater ring has a first end designed to interconnect with the asbestos cement pipe and has a linear distance of 5" (A) which has an internal diameter of 22.46", as at 12, which has a chamferred end portion 14 and an internal groove 16 to accept an O-ring 18.

The second end of the adapter ring 6, which is adapted to interface with the fiberglass reinforced plastic conduit 4 has a length of 5.5" (B) and has an internal diameter of 23.04" as at 20. The internal diameter 20 is smooth throughout its entire length with the exception of a chamferred end butt portion 22. The fiberglass reinforced plastic conduit includes an integral first annular ridge 24 having an external diameter of 23.00" and a second circumferential external ridge 26 having an external diameter 22.70" forming a groove 28 therebetween to receive O-ring 30.

Figure 3:
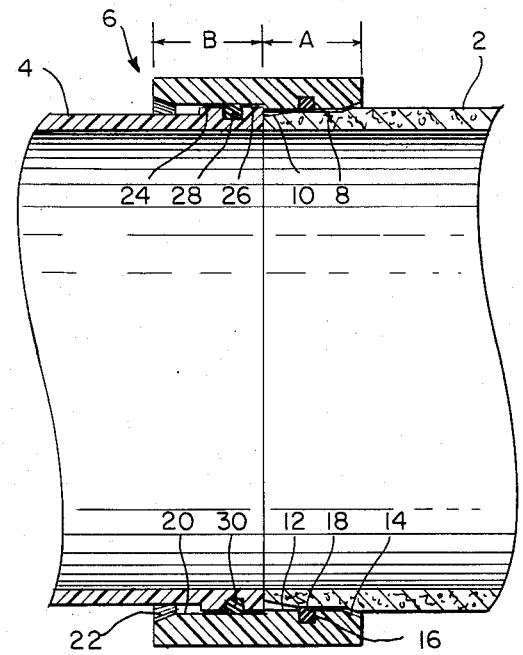
FIG. 3 depicts an alternate seal configuration.

The alternate embodiment of the seal as seen in FIG. 3 includes a modified ring 6 including a configured seal receiving groove including, as seen in cross-section, a deep thin end portion 40 adjacent a shallow portion 42 including a concave section 44 and terminating at the outer end in a T-configured main portion 46 having a broad stem portion 48. The seal element 50 is preferably molded in place and therefore is configured to fill the receiving groove and includes a tail element 2, a bridging portion 54 and a main sealing section 56 including ribs 58 and a pair of inwardly projecting lips 60,62 with lip 60 angling radially inwardly and axially toward the end of the ring 6.

Thus, as can be seen, the present invention contemplates a relatively simple structure which quickly and easily enables the user to butt join a fiberglass reinforced plastic conduit with an existing asbestos cement conduit enabling the continued use and the meeting of the standards of health and environment.

I claim:

1. A pipe coupling element fabricated of fiberglass reinforced plastic and being capable of absorbing the differential expansion of abutting pipe sections of differing material, which are free to move relative to and within said coupling element said coupling comprising:

an annular sleeve having a first end of a predetermined thickness and including an inwardly facing annular groove capturing a unitary, resilient sealing element to be sealingly compressed against the exterior surface of the first pipe to be coupled, and a second end of lesser thickness than said predetermined thickness and having a substantially smooth interior surface to sealingly engage a resilient sealing element captured by the second pipe to be coupled.

* * * * *